Oct. 24, 1961 E. J. JOFFE 3,005,609
CABLE SUPPORT AND SPACER
Filed April 17, 1959 2 Sheets-Sheet 1
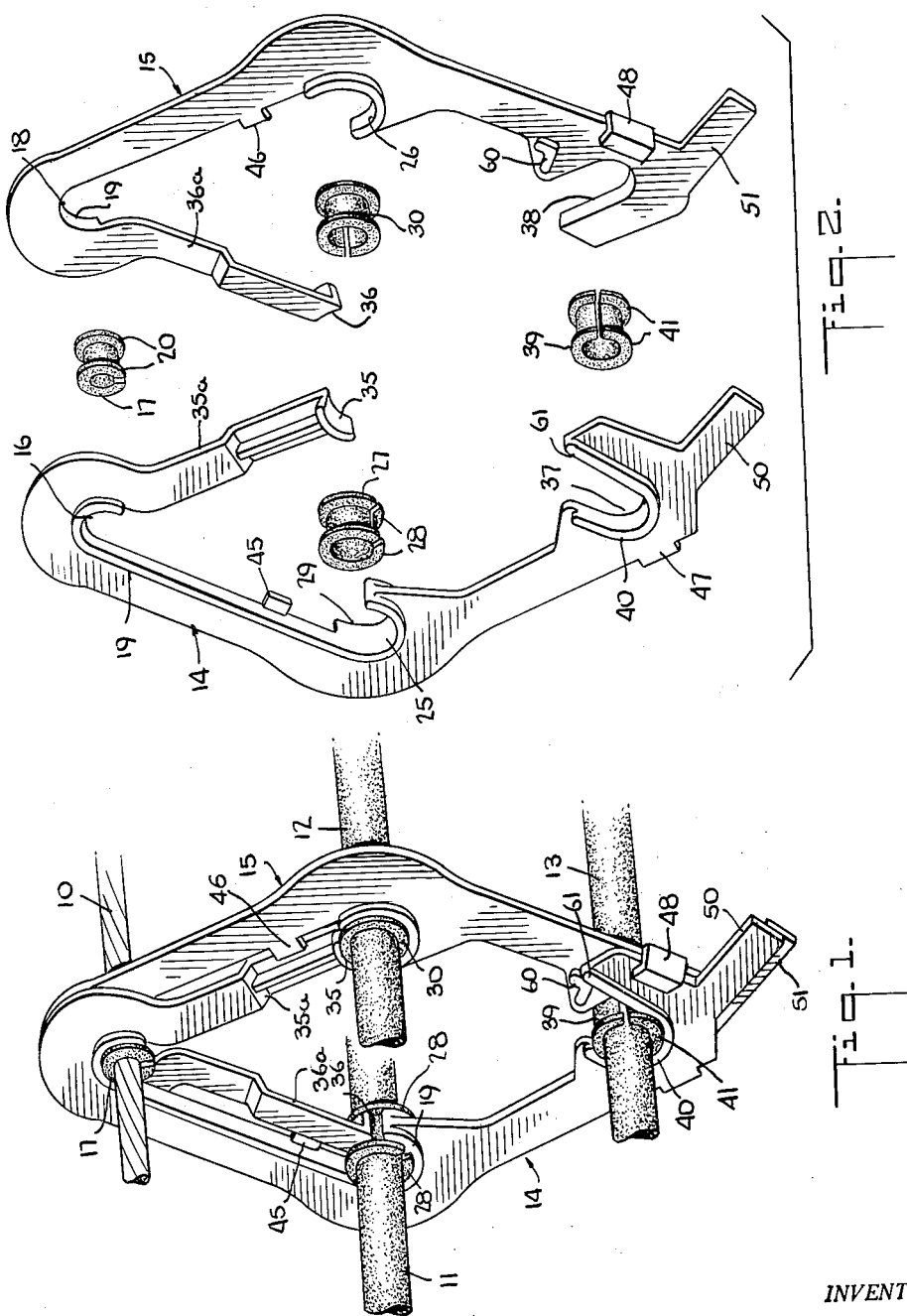
INVENTOR.
Edward J. Joffe
BY
A. H. Golden

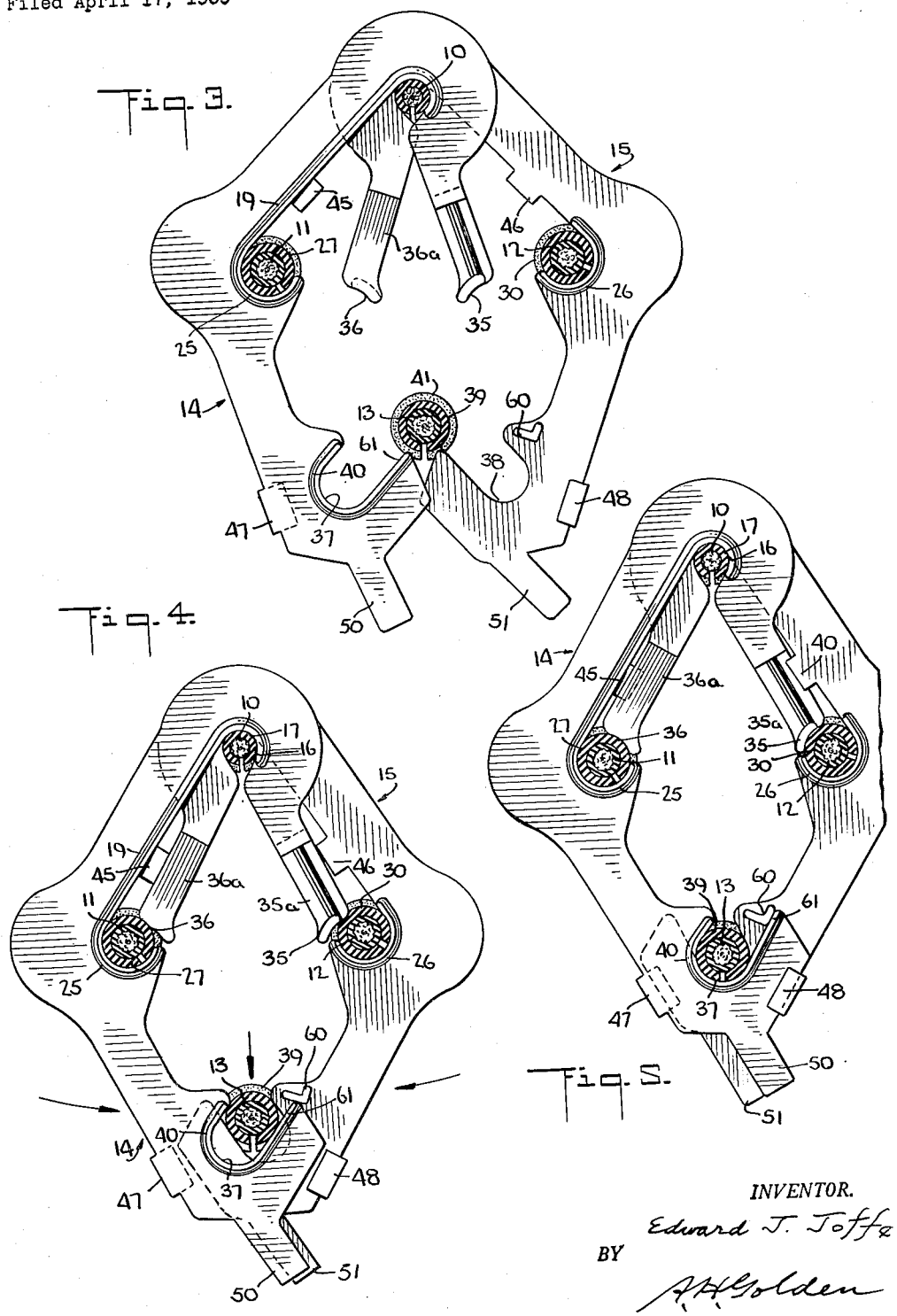

United States Patent Office 3,005,609
Patented Oct. 24, 1961

3,005,609
CABLE SUPPORT AND SPACER
Edward J. Joffe, Summit, N.J., assignor to Park Plastics Co., Inc., Linden, N.J., a corporation of New Jersey
Filed Apr. 17, 1959, Ser. No. 807,173
11 Claims. (Cl. 248—61)

This invention relates to a cable clamp of the type used for supporting and spacing electric power cables.

Cables suffer considerable damage when allowed to move freely in the wind, and particularly when this movement by the wind forces the cables against walls or trees. Further, the weight of the cable itself will cause considerable damage as it is moved about through the blowing of a wind. In addition, when several cables are allowed to hang freely, they rub against one another, damaging the insulation, and when they pass through a series of trees, the trees must be pruned to allow for the movement of the cables, since otherwise considerable damage will take place.

In view of the general facts that I have here outlined, the art has developed numerous types of cable clamps for holding cables in particular spaced positions, with the cables supported in these spaced positions by a support cable, known in the art as a messenger cable.

More particularly, it is customary in the art to utilize a pair of clamping members that engage a series of cables to hold those cables supported in particular spaced relation, the clamping members being in turn supported by the so-called messenger cable.

Clamping members of the particular class must obviously be constructed of material that is non-conducting of electricity, and yet quite strong. By far the greater problem, is the manipulation of the clamping members so that they may be secured to the messenger cable and the series of power cables, all without requiring complex manipulation. This is due to the fact that because of the voltage generally transmitted through the cables, the clamps must be manipulated by tools that are themselves insulated from the operator.

The art has long faced the particular problem I have outlined, but insofar as I know, there has never been developed a clamping construction particularly adapted to hold a series of cables in position and supported by a messenger cable, the clamping members being easily movable into engaging position through means that are extremely simple so that no manipulation of nuts, bolts, or other complex fastening means is required. Moreover, through my construction, the cables are readily released from the clamping members by an extremely simple operation.

As a feature of my invention, I use a pair of clamping plates each adapted for ready support on a messenger cable. The clamping plates are adapted for relative pivotal motion so as to secure thereto a series of cables as well as the messenger cable. Furthermore, this pivoting motion results in an interlocking of the two plates without the use of outside locking means, bolts, or nuts.

As an additional feature, the unlocking of the plates is readily effected without complex operation or manipulation of parts. As a still further feature, the cables themselves, or the insulating means for the cables, contribute yielding means for yieldingly maintaining the clamping plates in interlocking relation once they are brought into interlocking relation against the yielding force of the said yielding means.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings, FIG. 1 is a perspective view of the two clamping plates of my invention after they have been interlocked in supporting relation to three cables and a messenger cable.

FIG. 2 is a perspective exploded view of the two clamping plates forming my invention, together with the spools used in connection therewith.

FIG. 3 illustrates the two clamping plates after they have been brought into engagement with a messenger cable, and supporting two cables.

FIG. 4 illustrates the plates just prior to their interlocking engagement, and after a third cable has been placed in supported position.

FIG. 5 illustrates the two clamping plates after they have been interlocked.

Referring now more particularly to the drawings, and especially FIGS. 1 and 2, the messenger cable is designated by reference numeral 10, while the power cables are designated by reference numerals 11, 12, and 13. The left hand clamping plate is designated by reference numeral 14, while the right hand plate bears reference numeral 15.

The two clamping plates are formed of Lucite or some similar dielectric material shaped as well illustrated in the drawings. It will be well to emphasize at this point that the two plates are substantially similar in construction but vary slightly to permit effective interlocking. The left hand plate 14 has an upper hook portion 16 adapted to slip over an insulating spool 17 that is applied to the messenger cable in a manner standard in this art. The clamping member 15 is similarly equipped with an upper hook portion 18 adapted to slip over the spool 17. The thickness of the plates 15 together with the reinforcing ribs 19 of the plates is such that the plates 14, 15, including the ribs 19, will lie between the flanges 20 of the spool 17. This makes it possible for the spool to act as an effective pivot.

Plate 14 is equipped with a bearing 25 and plate 15 with a similar bearing 26. A spool 27 surrounding the cable 11 will fit into the bearing 25, with the flanges 28 of the spool 27 lying at the outer surface of the rib 19 on the one side, and at the outer surface of a similar reinforcing rib 29 on the other side. The spool 30 surrounding the cable 12 will fit similarly within the bearing 26 of the clamping plate 15. Plate 14 is equipped with a dogging portion 35 on an arm 35a, and plate 15 with a similar dogging portion 36 at the end of an arm 36a, the function of which will be described shortly.

Plate 14 has a lower hook 37, and clamping plate 15 has a lower hook 38. These hooks are adapted to interlock relatively to a spool 39 surrounding the third cable 13. It will be noted that the hook portion 37 is ribbed at 40 and a similar rib will be found on the opposed side of the hook 38 of plate 15. The distance between the flanges 41 of spool 39 is such that the flanges 41 will lie against the outer edge of rib 40 of clamping plate 14 on one side, and the similar rib of clamping plate 15 at the other side.

The several spools, as will appear later, help to hold the two clamping plates 14, 15 against axial separation. In addition, the several plates are also equipped with limiting and retaining lugs designated by the reference numerals 45, 46, 47, and 48 for interlocking the two plates and further preventing their axial endwise separation.

Plate 14 is equipped with a handle portion 50 to facilitate its manipulation, while plate 15 is equipped with a similar handle portion 51. A detent lug 60 is found on the plate 15, and this is adapted to interlock with the detent surface 61 on the clamping plate 14.

In order to appreciate and understand just how the two clamping plates are brought into that engagement that is well illustrated in FIG. 1, I shall now refer to FIGS. 3 to 5, inclusive. In FIG. 3 the spool 27 is shown deposited in the bearing 25 of clamping plate 14, while the spool 30 is shown deposited in the bearing 26 of the clamping plate 15. At the same time, it will be noted that upper hooks 16 and 18 have been slipped over spool 17 secured on messenger cable 10, being held in effective operating relation by the flanges of spool 17. This is a very important feature as will be understood by those skilled in the art. The third spool 39 about cable 13 lies in an intermediate position over the two lower hooks 37 and 38.

The operator will now, preferably through handle portions 50 and 51, pivot the two plates 14 and 15 toward one another about the axis of the messenger cable 10 and the spool 17 to the position of FIG. 4. At the same time, cable 13 and the spool 39 will be pulled downwardly towards the hooks 37 and 38. The result of this coaction of the several elements of the combination is that the spool 39 will ride partially into the hooks 37 and 38, as best illustrated in FIG. 4. At the same time, dogging portions 35 and 36 will ride respectively against the spools 27 and 30. The dogging portions 35 and 36 through such movement will act to lock the spools 27 and 30 within the bearings 25 and 26 as is quite obvious.

The final pivotal movement of the plates toward one another brings them into the position illustrated in FIGS. 1 and 5. In this position, it will be noted that the dogging portions 35 and 36 are in full locking relation to the spools 27 and 30, so that the spools are well locked within the bearings 25 and 26. It will further be noted that the spool 39 is now fully within the two lower hooks 37 and 38, and since the throats of the two lower hooks 37 and 38 are at an angle relatively to one another, the spool 39 cannot be removed from the two hooks. It will also be noted in FIGS. 1 and 5 that hooks 16 and 18 are so related to the spool 17, that the spool 17 cannot move outwardly away from the hooks because of the disalignment of their throats. Therefore, the two clamping plates 14 and 15 are well secured to the messenger cable through the spool 17 to be supported thereby.

Finally, in FIGS. 1 and 5, the detent surface 61 has moved behind the detent lug 60, so that the two plates are interlocked in their position of FIGS. 1 and 5 against pivotal separation. It will be noted further that in FIGS. 1 and 5 the lug 45 is engaged by the arm 36a on which the dogging portion 36 is formed. Similarly, the lug 46 is engaged by the arm 35a on which the dogging portion 35 is formed. It will also be seen that the lugs 47, 48 are engaged by portions of the opposed plates. Thus, the several limiting and retaining lugs 45, 46, 47 and 48 cooperate with the several spools to hold the two clamping plates against endwise or axial separation.

It will be appreciated further that the movement of the two clamping plates from the position of FIG. 4 to the position of FIG. 5 is well resisted by the three spools 27, 30, and 39, the spools being formed of rubber, neoprene, or polyethylene so as to form effective insulators as well as to yield to the action described. Thus, spools 27 and 30 resist the pressure of the dogging portions 36 and 35 as those dogging portions move to the position of FIG. 5 from the position of FIG. 4. The spool 39 naturally resists movement by the camming action of the two hooks 37, 38. Therefore, the interlocking action at 60, 61 is brought about against the resistance of the spools. Because the locking engagement of the detents 60, 61 is effected against a yielding resistance, the detents thereafter are also maintained locked by the yielding resistance of the several spools. Further, the separation of the detents 60, 61 can be brought about at any time by overcoming the yielding resistance of the several spools. Incidentally, the dogging portions 36 and 35 are formed so as to allow that sliding motion of these portions relatively to the spools that is necessary to effect both engagement and disengagement of the interlocking plates 14, 15.

Those skilled in the art will now appreciate further that the manipulation of the clamping plates 14, 15 may be effected without complicated tools or fastening means so as to make possible the ready assembly of the clamping plates to cables in the field by operators equipped with extremely simple tools. I believe the rather considerable merits of my invention will now be apparent.

I now claim:

1. In a cable clamp of the class described, a pair of clamping plates each having an open hook portion to be applied over a messenger cable through the throat of said hook portion, a bearing formed on each plate below its hook and having a throat for the entry of a cable whereby one cable may be secured in each bearing, a dogging portion on each plate adapted to overlie the throat of the bearing of the other plate when said plates swing relatively to one another about the messenger cable, and interlocking integral retaining and detent portions on each of said plates movable into engagement with one another when said plates swing on said messenger cable to bring said dogging portions to a position overlying said throats, said interlocking integral retaining and detent portions being formed for holding said plates against both separation along the axis of said messenger cable and pivotal movement relatively to one another.

2. In a cable clamp of the class described, a pair of clamping plates each having an integral open hook portion to be applied over a messenger cable through the throat of said hook portion, a bearing formed on each plate below its hook and having a throat for the entry of a cable whereby one cable may be secured in each bearing, an integral dogging portion on each plate adapted to overlie the throat of the bearing of the other plate when said plates swing relatively to one another about the messenger cable, interlocking integral retaining and detent portions on each of said plates engaging one another as said plates swing to cause said dogging portions to overlie said throats, said retaining and detent portions then holding said plates against separation along the axis of said messenger cable and also against relative pivotal movement, and said hook portions of said plates being formed to disalign the hook throats when said retaining and detent portions are interlocked so that a barrier is presented to said mesenger cable to hold it within said hooks.

3. In a cable clamp of the class described, a pair of clamping plates each having an upper open hook portion to be applied simultaneously over a single messenger cable through the throat of said hook portion, and a lower hook portion to be applied about a single lowermost cable, a bearing formed on each plate between its hook portions and having a throat for the entry of a cable whereby one cable may be secured in each bearing, a dogging portion on each plate initially spaced from the throat of the bearing of the other plate and adapted to overlie the said throat of the bearing of the other plate when said plates swing relatively to one another about the messenger cable, interlocking integral retaining and detent portions on each of said plates initially separated and engaging one another when said dogging portions overlie said throat, said retaining and detent portions when moving into engagement having integral portions thereof for holding said plates against separation along the axis of said messenger cable and also against relative pivotal movement, and said hook portions of said plates being formed to disalign the hook throats when said retaining and detent portions are interlocked so that a barrier is presented to the messenger and lowermost cables within said hooks to hold said cables within said hooks.

4. In a cable clamp of the class described, a pair of clamping plates each having an upper open hook portion to be applied over a single messenger cable through the throat of said hook portion and a lower hook portion to be applied about a lowermost cable, interlocking integral retaining and detent portions on each of said plates engaging one another when said plates swing about said messenger cable for locking said plates against separation along the axis of said messenger cable and also against relative pivotal movement, said hook portions of said plates being formed to disalign the hook throats when said retaining and detent portions are interlocked so that a barrier is presented to the cables within said hooks to hold said cables within said hooks.

5. In a cable clamp of the class described, a pair of clamping plates each having an upper open hook portion to be applied over a messenger cable through the throat of said hook portion and a lower hook portion to be applied about a cable with said plates juxtaposed, an integral detent portion on one plate engaging a detent lug on the other of said plates when said plates swing about said messenger cable for locking said plates against pivotal separation, retaining portions integral with each of said plates and engaging during said pivotal motion to lock said plates against separation along the axis of said messenger cable, said hook portions of said plates being formed to disalign the hook throats when said detent portion and lug are interlocked so that a barrier is presented to the cables within said hooks to hold said cables within said hooks.

6. In a cable clamp of the class described, a pair of clamping plates each having an open hook portion to be applied over a messenger cable through the throat of said hook portion whereby said plates pivot in juxtaposed relation on a messenger cable, a bearing formed on each plate below its hook and having a throat for the entry of a cable whereby one cable may be secured in each bearing, a dogging portion on a part of the hook of each plate offset relatively to the bearing portion of said plate whereby the dogging portion of one plate overlies the throat of the bearing of the other plate when said plates swing relatively to one another about the messenger cable, interlocking fixed integral retaining and detent portions on each of said plates engaging one another when said plates swing to bring said dogging portions to overlie said throats, said retaining and detent portions holding said plates against separation along the axis of said messenger cable and also against relative pivotal movement, and the bearings and dogging portions of said plates being so dimensioned relatively to the cable portions engaged thereby that the cable portions resist the movement of said plates to effect engagement of said retaining and detent portions, while yieldingly holding said retaining and detent portions in locking engagement once they are engaged.

7. In a cable clamp of the class described, a pair of clamping plates each having an open hook portion to be applied over a messenger cable through the throat of said hook portion, a bearing formed on each plate below its hook and having a throat for the entry of a cable whereby one cable may be secured in each bearing, each of said plate hooks having an extension forming a dogging portion adapted to overlie the throat of the bearing of the other plate when said plates swing through said hooks relatively to one another about the messenger cable, fixed interlocking detent and retaining portions on said plates engaging one another when said dogging portions have moved to overlie said throats, said detent and retaining portions holding said plates against separation along the axis of said messenger cable and also against relative pivotal movement, and flanged spools surrounding at least certain of the cable portions engaged by said plates with the flanges of said spools in contact with the outer surfaces of said plates to help maintain said plates against said axial separation.

8. In a cable clamp of the class described, a pair of clamping plates each having an open hook portion to be applied over a messenger cable through the throat of said hook portion, bearings formed on said plates for the entry of cables, dogging portions on said plates engaging said cables in said bearings when said plates swing relatively to one another about the messenger cable, interlocking integral retaining and detent portions formed on each of said plates engaging one another for holding said plates against separation along the axis of said messenger cable and also against relative pivotal movement, the bearings and dogging portions of said plates being so dimensioned relatively to the cable portions that the cable portions resist the pivotal movement of said plates required to bring about the engagement of said retaining and detent portions, and yieldingly hold said retaining and detent portions in locking engagement thereafter.

9. In a cable clamp of the class described, a pair of juxtaposed clamping plates each having an open hook portion to be applied over a messenger cable through the throat of said hook portion whereby said plates pivot relatively to one another about said messenger cable while each of said plates hangs through its hook on said messenger cable, each of said plates having an open ended slot with said slots positioned angularly to one another when said plates are applied over a messenger cable, both said slots engaging a single power cable with said cable entering substantially simultaneously into both slots when said plates swing relatively to one another about the messenger cable to overlap said slots, and integral retaining and detent means formed on one plate engaged by retaining and detent means on the other of said plates for locking said plates against separation along the axis of said messenger cable and also against relative pivotal movement when both said slots are in engagement with said power cable with a surface of each slot closing the open end of the other slot.

10. In a cable clamp of the class described, a pair of juxtaposed clamping plates each having an open hook portion to be applied over a messenger cable through the throat of said hook portion whereby said plates pivot relatively to one another about said messenger cable, cable engaging means on said plates cooperatively engaging a power cable when said plates swing relatively to one another about the messenger cable while each is supported through its hook portion by the messenger cable, and fixed interlocking retaining and detent portions integral with each of said plates engaging one another through relative movement therebetween for locking said plates against separation along the axis of said messenger cable and also against relative pivotal movement as said plates engage said power cable.

11. In a cable clamp of the class described, a pair of juxtaposed clamping plates each having an open hook portion to be applied over a messenger cable through the throat of said hook portion whereby said plates pivot relatively to one another about said messenger cable, cable engaging means on said plates engaging a flanged yielding spool surrounding a part of a power cable when said plates swing relatively to one another about the messenger cable, said plates being juxtaposed with the parts of both said plates in contact with said spool lying between the flanges of said spool, and fixed interlocking retaining and detent portions on each of said plates engaging one another through said pivotal movement therebetween for holding said plates against pivotal separation as said plates engage said spool and also against separation axially of said messenger cable, said relative movement between said plates to effect interlocking of the retaining and detent portions being yieldingly resisted by said spool.

References Cited in the file of this patent

UNITED STATES PATENTS

| | | |
|---|---|---|
| 2,820,083 | Hendrix | Jan. 14, 1958 |
| 2,891,751 | Raypholtz | June 23, 1959 |
| 2,899,160 | Sher et al. | Aug. 11, 1959 |
| 2,928,636 | Flower | Mar. 15, 1960 |